US008293423B2

(12) United States Patent  (10) Patent No.: US 8,293,423 B2
Hahn  (45) Date of Patent: Oct. 23, 2012

(54) FUEL CELL STACK WITH A LIGHTWEIGHT CONSTRUCTION

(75) Inventor: Robert Hahn, Berlin (DE)

(73) Assignee: Fraunhofer-Gesellschaft zur Foerderung der Angewandten Forschung E.V., München (DE)

( * ) Notice: Subject to any disclaimer, the term of this patent is extended or adjusted under 35 U.S.C. 154(b) by 392 days.

(21) Appl. No.: 12/526,935

(22) PCT Filed: Feb. 12, 2008

(86) PCT No.: PCT/EP2008/001205
§ 371 (c)(1),
(2), (4) Date: Jan. 21, 2010

(87) PCT Pub. No.: WO2008/098791
PCT Pub. Date: Aug. 21, 2008

(65) Prior Publication Data
US 2010/0119903 A1    May 13, 2010

(30) Foreign Application Priority Data

Feb. 12, 2007 (DE) .......................... 10 2007 007 704

(51) Int. Cl.
*H01M 2/38* (2006.01)
*H01M 2/40* (2006.01)
*H01M 8/24* (2006.01)

(52) U.S. Cl. ..................................................... 429/457

(58) Field of Classification Search .................. 429/434, 429/435, 457, 517, 518
See application file for complete search history.

(56) References Cited

U.S. PATENT DOCUMENTS

| | | | |
|---|---|---|---|
| 5,904,740 A * | 5/1999 | Davis | .............................. 44/385 |
| 6,503,650 B1 | 1/2003 | Yasuo et al. | |
| 6,555,261 B1 * | 4/2003 | Lewinski et al. | ............. 429/513 |
| 6,607,857 B2 * | 8/2003 | Blunk et al. | .................. 429/432 |
| 2003/0232234 A1 * | 12/2003 | Cisar et al. | ...................... 429/38 |
| 2005/0084730 A1 * | 4/2005 | Ohtani et al. | .................... 429/34 |
| 2005/0202297 A1 | 9/2005 | Schmitz et al. | |
| 2006/0216568 A1 | 9/2006 | Kohno et al. | |
| 2006/0269821 A1 | 11/2006 | Nakagawa | |
| 2007/0286949 A1 * | 12/2007 | Doyen et al. | ............... 427/126.2 |

FOREIGN PATENT DOCUMENTS

| | | |
|---|---|---|
| DE | 102 17 034 | 10/2003 |
| WO | 01 / 48852 | 7/2001 |

* cited by examiner

*Primary Examiner* — Roy King
*Assistant Examiner* — Carlos Barcena
(74) *Attorney, Agent, or Firm* — Fay Kaplun & Marcin, LLP

(57) ABSTRACT

The invention relates to a fuel cell stack composed of at least one fuel cell (1) and at least two separator structures (2, 2'). Said separator structures (2, 2') are open on at least one side towards the exterior in order to allow passive exchange of air. Also, said separator structures comprise a channel system (53, 53') for guiding fuel. The fuel cell can be embodied as a bi-fuel cell (1) composed of two electric cells. The anodes or cathodes of the two electric cells are arranged opposite each other.

27 Claims, 13 Drawing Sheets

FUEL CELL STACK WITH A LIGHTWEIGHT CONSTRUCTION

CROSS-REFERENCE TO RELATED APPLICATIONS

Figure 1A:
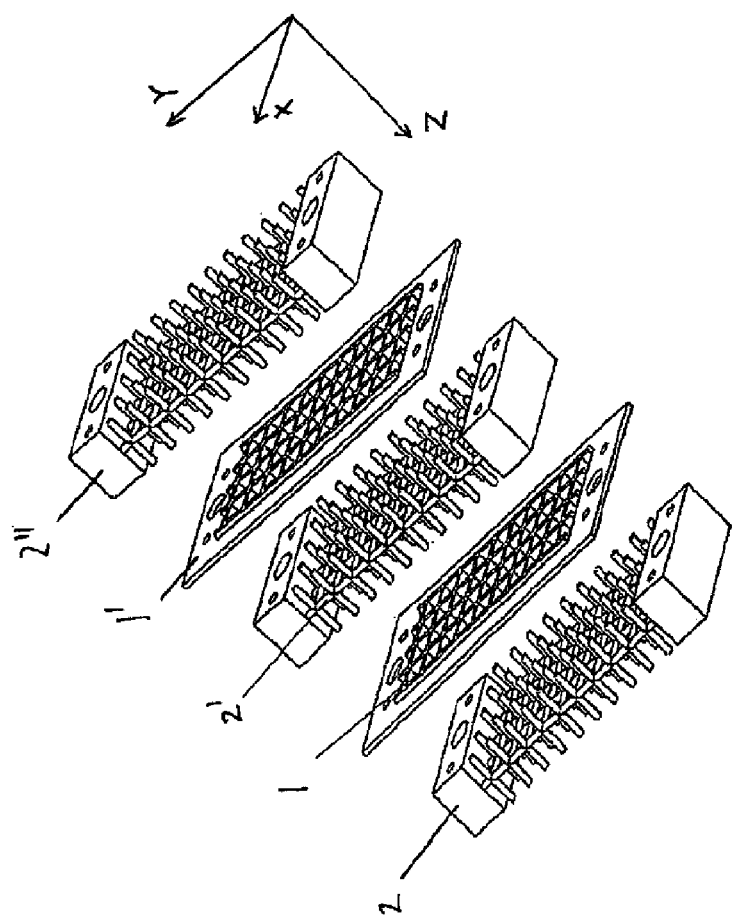

This application is a U.S. National Phase of the International Application No. PCT/EP2008/001205 designating the U.S., filed Feb. 12, 2008 and published in German on Aug. 21, 2008 as WO 2008/098791, which claims priority to German Patent Application No. DE 10 2007 007 704.3, filed Feb. 12, 2007.

FIELD OF THE INVENTION

The invention relates to a fuel cell stack with a lightweight construction, which has at least one fuel cell and at least two separators. The separator structures are accordingly optimised in order to enable as good as possible passive ventilation of the fuel cell and to be as lightweight as possible, and also at the same time to guide out the ion products recombined on the cathode. In particular, the fuel cell can be configured as a bi-fuel cell.

BACKGROUND OF THE INVENTION

Fuel cells are suitable for obtaining electrical energy from chemical energy carriers without thereby being subjected to the restrictions of the Carnot cycle. In order to increase the power of fuel cells, these are often disposed in so-called fuel cell stacks in which a plurality of fuel cells are connected together adjacently or stacked and thus a higher total power can be achieved. Normally, the fuel cell thereby comprises two electrodes which are separated from each other by a membrane or an ion conductor. The anode is subjected to a flow of fuel which is oxidised there. The oxidised positively charged ions migrate through an electrolyte membrane towards the cathode side where they are recombined with the reduced oxidant, such as e.g. air, and are discharged from the fuel cell.

In the construction of modern fuel cell stacks, care must be taken in particular to reduce the size and the weight of the fuel cell stacks so that these can be used in applications where, above all, miniaturisation and weight are to the fore. These are e.g. portable electronic devices or technical-medical devices which are portable on the body or small flying devices.

In U.S. Pat. No. 6,986,961 B1, a fuel cell stack is described, which is constructed from individual fuel cells which follow the standard construction with bipolar plates in which anode and cathode alternate. In this construction, the current flows vertically through the stack so that all the components must be electrically conductive. This is achieved by undulating metal sheets which are embedded in a frame comprising glass fibre-reinforced plastic and are sealed, on the anode side, with a sealing frame. Although the construction with an undulating metal sheet is lighter than production with conventional bipolar plates, a fuel cell stack of this type still has a high weight because of the stainless steel undulating sheets, the high number of components and the high sealing complexity and also the ratio of height to spacing of the undulations which are relatively firmly prescribed by the undulating metal sheet. As a result, the ventilation properties of the separators are restricted.

A further development is represented by the so-called bi-fuel cells. Here, two cells which are electrically insulated from each other are combined such that a fuel cell stack constructed from these cells is constructed in the sequence of cathode, membrane, anode, anode, membrane, cathode or anode, membrane, cathode, cathode, membrane, anode. In US 2005/0 026 021 A1, a stack in the bi-fuel cell type of construction is described, which again loses the saving in weight because of the bi-fuel cell type of construction as a result of solid separator structures and the immission in the fuel. Furthermore, no satisfactory passive ventilation and satisfactory transport away of the reactands is made possible because of the type of construction of the separator structure.

SUMMARY OF THE INVENTION

It is therefore the object underlying the invention to produce a fuel cell stack with a lightweight construction, in which as light a weight as possible is present and in which the separator structures are constructed such that they enable good passive ventilation of the fuel cells and, at the same time, good transport away of the reactands can take place.

DETAILED DESCRIPTION OF THE PREFERRED EMBODIMENT

This object is achieved according to the invention by a fuel cell stack according to claim 1.

The fuel cell stack hereby comprises at least one fuel cell and at least two separator structures, respectively one separator structure being disposed on respectively one of the two oppositely situated sides of the fuel cell. The construction of a fuel cell is provided by a sequence of anode current conductor, membrane electrode unit and cathode current conductor. Connected to the side of the cathode current conductor which is orientated away from the membrane electrode assembly is a separator structure which serves for the purpose of guiding an oxidant, such as e.g. air, to the cathode, the separator structure according to the invention being distinguished in that in is open to the environment on at least one side in order thus to enable a passive exchange of air of the fuel cell with its surroundings. Furthermore, the separator structure, in the edge region thereof, has a closed channel system for fuel with the intent that the region of the separator for the passive exchange of air and the channel system are configured separately from each other. Furthermore, the contact pressure for operation of the fuel cell can be transmitted via the separator structure.

Advantageous developments of the fuel cell stack are described in the dependent claims.

An advantageous development of the invention is the use of bi-fuel cells. A bi-fuel cell hereby has at least one anode or cathode and at least two membrane electrode assemblies and also two cathodes or anodes. The sequence is such that, viewed in a cross-section from left to right, a cathode current conductor, a membrane electron assembly, an anode current conductor, a membrane electrode assembly and a cathode current conductor describe the minimum elements of a bi-fuel cell. Consequently, two electrical cells are formed in one bi-fuel cell, which electrical cells are separated at least in parts by the anode current conductor. When using bi-fuel cells, respectively one separator structure is disposed on one of the two oppositely situated sides of the bi-fuel cell. The advantage of the fuel cell stack described here resides in the fact that there is a saving in weight because of the bi-fuel cell construction and, at the same time, a passive exchange of air with the environment can take place via the separator structure so that a further saving in constructional elements is produced.

An advantageous development of the invention is that the fuel cell has a closed anode region. The anode region is thereby sealed relative to the environment with seals. This means that the anode current conductor or the membrane electrode assemblies have seals so that, between the at least one membrane electrode assemblies of an individual fuel cell or the two membrane electrode assemblies of one bi-fuel cell, a closed region is produced. In the case of using bi-fuel cells, the advantage resides in the fact that a fuel cell distribution structure can be used equally for two adjacent anodes and hence the number of terminals is halved and also the pressure drop is reduced and the fuel is restricted to the narrow region between the membrane electrode assemblies. When using normal fuel cells, the just-mentioned advantage is exploited. As a result, a further saving in weight is produced. This is advantageous in addition since the individual fuel cell can be tested thus individually for the functionality thereof, before incorporation in the fuel cell stack. Consequently, the possibility is avoided of checking the functionality of the fuel cell stack only by means of the total arrangement of the fuel cell stack. As a result, a further advantage is produced in the case of any possible fault analysis.

A further advantageous development of the invention is that the fuel cell has a non-active edge region. This means that the fuel cell has a region which is not covered by the membrane electrode assemblies. As a result, no energy can be obtained in this region since both electrons and ions are conducted into this region. In conjunction with the advantageous development that the fuel cell has a closed anode region, neither an electron exchange nor an ion exchange between the anode- and cathode side takes place in this non-active region. Furthermore, the edge region which forms the non-active region, in comparison with the active region, has an additional metallisation. The advantage of the additional metallisation in conjunction with the non-active edge region resides in the fact that the ohmic resistance of the current conductors is reduced and, at the same time, cooling of the fuel cells is possible. By means of cooling of the fuel cell of this type, a higher power density and hence a lighter construction of the fuel cell stack can be achieved.

It is hereby particularly advantageous if the additional metallisation protrudes beyond the separator structure. As a result, the metallisation takes over in addition cooling of the fuel cell and acts like a cooling rib arrangement. The cooling ribs can protrude for example in the central region of the fuel cell further beyond the separator structure since the fuel cell is warmest in the centre and thus a uniform temperature distribution within the fuel cell is made possible.

A further advantageous development of the invention is if the bi-fuel cell has a solid, at least one-layer, fuel distributor structure, at least one layer being configured as anode current conductor. The advantage of a fuel distributor structure resides in the fact that the fuel can be distributed better over the entire anode.

A further advantageous development of the invention is if the fuel distributor structure, in the transverse direction, has a microflow field with depressions or raised portions on at least one side for better distribution of the fuel. The advantage resides in the fact that, in addition to a rough distribution of the fuel to the active region, a very much finer distribution of the fuel can be achieved with the help of the microflow field. It is hereby advantageous in particular if the fuel distributor layer has a separate fuel inlet- and fuel outlet system. In the case of a bi-fuel cell, respectively one microflow field for each electrical cell is applied on both sides of the fuel distributor structure.

A further advantageous development is if the microflow field has separate fuel inlet- and fuel outlet openings since better circulation of the fuel is thus achieved.

A further advantageous development of the invention is if the cathode current conductors have openings with a large opening ratio. As a result, sufficient supply of the cathode with air is ensured with the help of the separator structure. As openings, squares or circles are formed so that the cathode current conductor is configured as a continuous surface with large holes. The configuration as a regular grating is particularly advantageous. It is possible to configure the cathode current conductor as a foil and to apply a plurality of grating-shaped cathode current conductors, layered one above the other, on the membrane electrode assembly. The advantage of this arrangement resides in the fact that a further saving in weight can be achieved due to the grating-like arrangement and the foil construction. Furthermore, it is advantageous if the cathode current conductor grating is produced from a porous material in order thus to achieve a maximum reaction surface for the reduction of the oxidant.

A further advantageous development of the invention is that the separator structure has a carrier structure and, in the transverse direction relative to this carrier structure, has further additional elements on at least one side. The channels of the separator structure are hereby formed at least in parts by the intermediate space of the additional elements relative to each other. The advantage resides in the fact that a separator structure is produced with low material complexity, which separator structure, via the arrangement of the additional elements, can have a large opening ratio of the channels for supplying an oxidant and for discharging recombined ion products. As a result of the arrangement of the additional elements, as a function of the fuel and the oxidant, an air supply with natural convection can hereby be achieved. It is also possible that a fan with only a low pressure drop blows air into the channels with a large opening. The fan thereby requires only a small amount of power.

In order to make possible an advantageous construction of the fuel cell stack, it is advantageous furthermore that the separator structure has additional elements in both transverse directions of the carrier structure. Consequently, there results a sequence of separator, fuel cell, separator, fuel cell, separator. In the case of bi-fuel cells, two cathodes which belong to different bi-fuel cells and are separated merely by one separator structure can share a single air-supplying separator structure, which results in an additional saving in weight.

An additional advantage is produced if the carrier structure of the separator structure is configured at least partially as a grating or as struts with struts protruding therefrom since, as a result, a further saving in weight can be achieved.

A further advantageous development of the invention is if the additional elements of the carrier structure of the separator structure are configured as plates or columns or pins. The advantage results in that different channel geometries can be achieved. Thus meandering air channels can be produced for example by plates or a very large air supply region can be produced by columns or pins. This improves the supply of an oxidant by means of passive exchange of air.

A further advantageous development of the invention is if the spacings of the additional elements of the separator structure relative to each other are essentially equal to the spacings of the grating points of the cathode. The advantage resides in the fact that the end points of the additional elements during assembly are placed on the intersection points of the cathode current conductor grating such that the contact pressure required for operation of the fuel cell, or of the bi-fuel cell, can consequently be achieved solely on the basis of pressing on the separator structure. Such a separator structure can therefore produce an improved air supply and a suitable contact pressure for operation of the fuel cell in this weight-saving manner It is hereby advantageous if the separator structure is manufactured to be stable relative to pressure so that sufficiently high contact pressures can be achieved. The separator structure thereby has a mechanical minimum rigidity which is provided by the material properties and the construction so that contact pressures of up to 100 N/cm^2, typically between 10 N/cm^2 up to 50 N/cm^2, can be transmitted between individual fuel cells without individual additional elements of the separator structure being damaged or bending, or the carrier structure being destroyed.

As suitable advantageous materials for the separator structure, it is advantageous to use plastic materials or resin-saturated plastic knitted fabrics, and also composite materials reinforced with glass fibres or carbon fibres or nanotubes. It can also be advantageous to configure the additional elements by means of specially formed undulating metal sheets on a carrier structure produced from plastic material.

A further advantageous development of the invention is that the separator structure has additional electrical contactings in the edge region. Furthermore, it is hereby advantageous if the contactings through the edge region of the separator structure are connected via electrical supply lines. In this way, the electrical energy which is produced in the fuel cell or in the individual fuel cells of the bi-fuel cell can be conducted to the exterior via the edge region of the fuel cell and the edge region of the separator structure where it can be used by the most varied of electrical applications.

A further advantageous development of the invention is to configure the separator structure as edge element. It is hereby sensible to configure the carrier structure as a closed plate so that the separator can serve as part of a housing and various points exist in order to transmit the contact pressure via the edge elements and the separator structures to all fuel cells present in the fuel cell stack.

A further advantageous development of the invention is if all components of the fuel cell are produced from plastic material or plastic composite materials or plastic materials with thin metallisations. By using lightweight plastic materials, a further saving in weight is produced.

An advantageous development of the fuel cell stack is if the individual fuel cells use hydrogen or methanol or ethanol as fuel.

Furthermore, it is an advantageous development if the volume of the fuel cell stack is between 1 cm$^3$ and 500 cm$^3$.

A further advantageous development of the invention is that the electrical cells of the bi-fuel cells or the individual bi-fuel cells are connected to each other in series or in parallel. In the case where the individual cells are connected in parallel, the construction of the bi-fuel cell can be produced almost completely from electrically conductive material. The two anodes and the two cathodes of the electrical individual cells of the bi-fuel cell are thereby connected via current conductors. The only insulation exists therefore between the anode and the cathode and is produced respectively by the electrically insulating membrane of the membrane electrode assembly. In the case of a connection of the electrical cells in series, the two electrical cells must be extensively insulated from each other. This means that at least one layer of the fuel distributor structure must have an insulating configuration. The advantage is produced therefrom that, because of the different connection modes, the fuel cell stack can be adapted to the requirements of the application connected thereto. In the case of using single fuel cells, the process can take place analogously thereto.

By connecting together a plurality of fuel cell stacks, a high total battery voltage can be produced easily or a robust total arrangement can be produced. The application to be operated by the fuel cell hereby determines whether a series connection or a parallel connection or a combination of both connections is most sensible.

A fuel cell stack according to the invention can be used in particular wherever a lightweight, reliable current supply is required, as is required for example for flying devices, such as a drone or in model construction. The fuel cell stack arrangement can be used both as drive voltage for operating a motor and as operating voltage for devices or circuits used in the flying device.

Also portable devices, such as laptops or mobile phones or medical devices carried on or in the body, can be operated with a fuel cell stack described here.

Further advantageous developments of the invention are described in the coordinated claims of the invention.

Figure 1B:
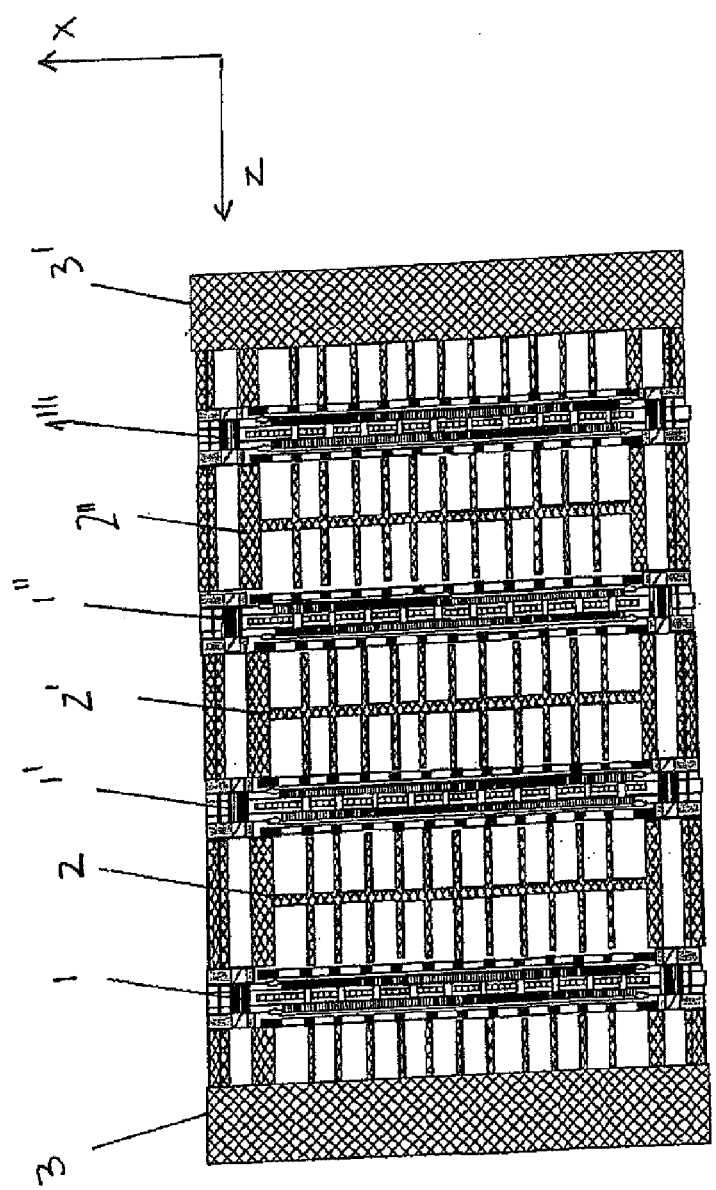
Figure 1C:
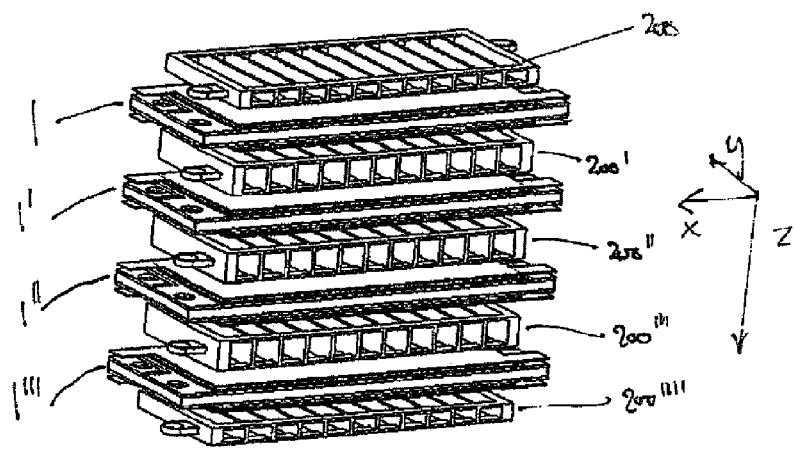
Figure 2A:
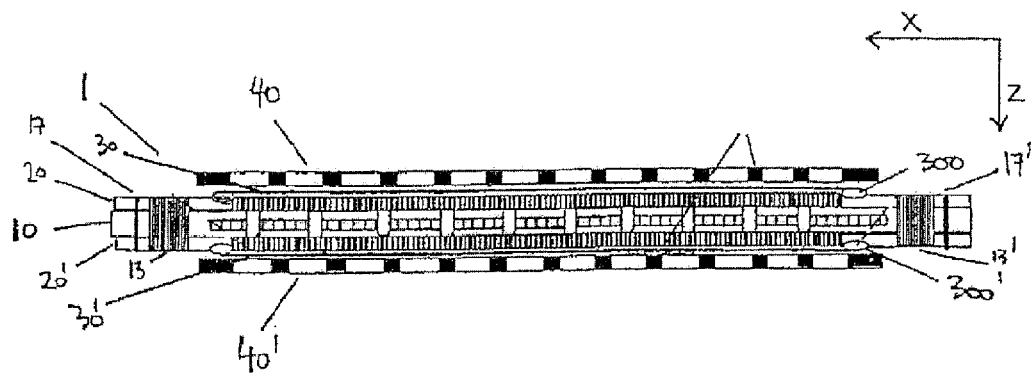
Figure 3A:
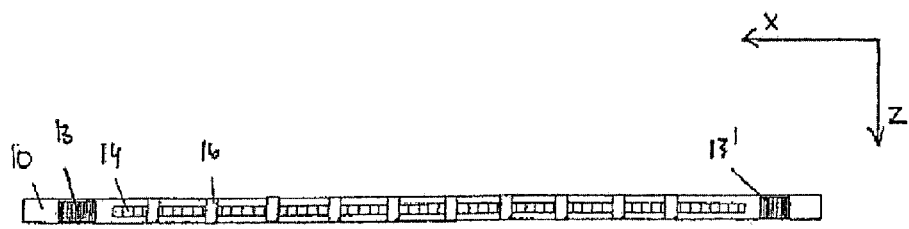
Figure 3B:
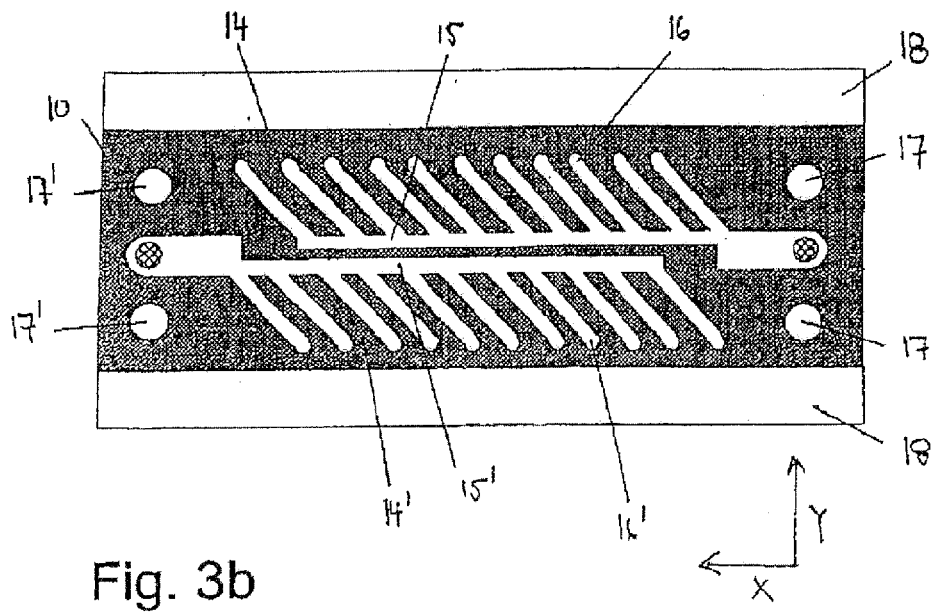
Figure 2B:
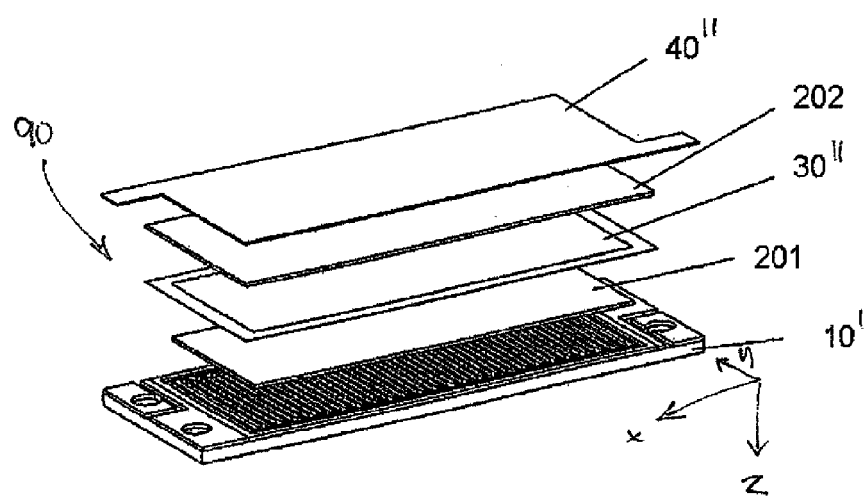
Figure 4A:
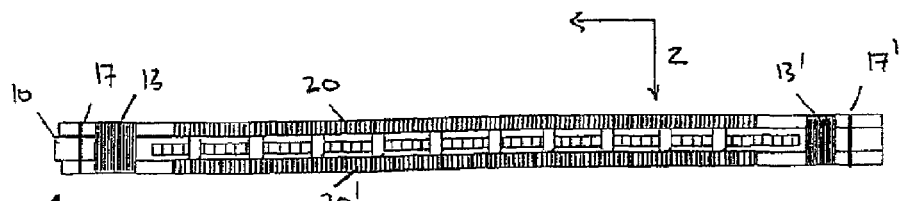
Figure 4B:
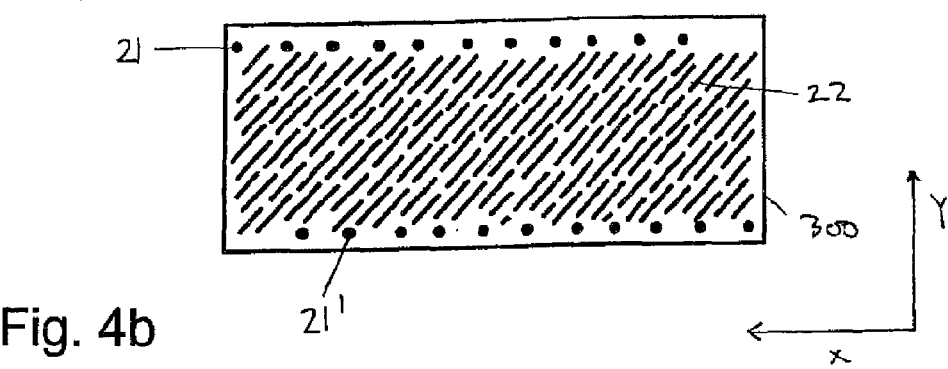
Figure 5A:
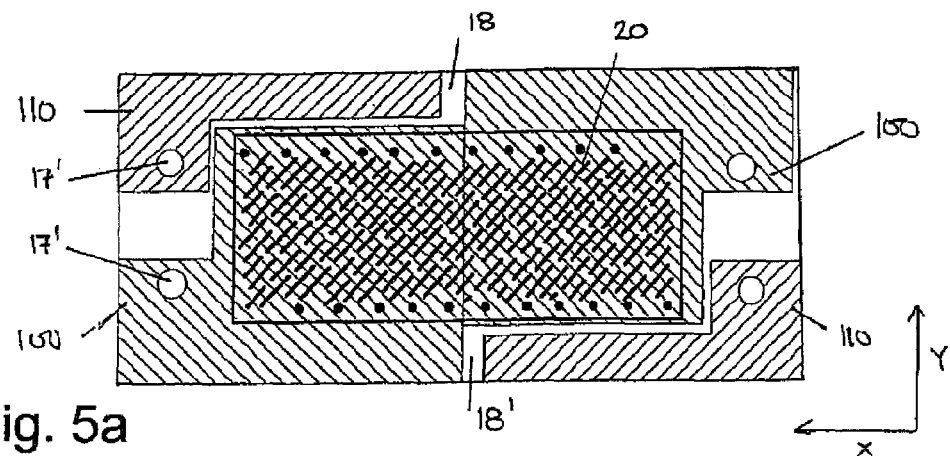
Figure 5B:
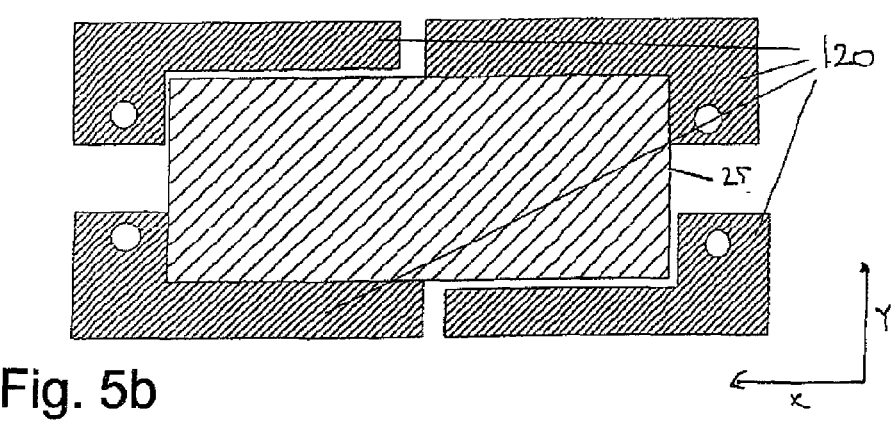
Figure 6:
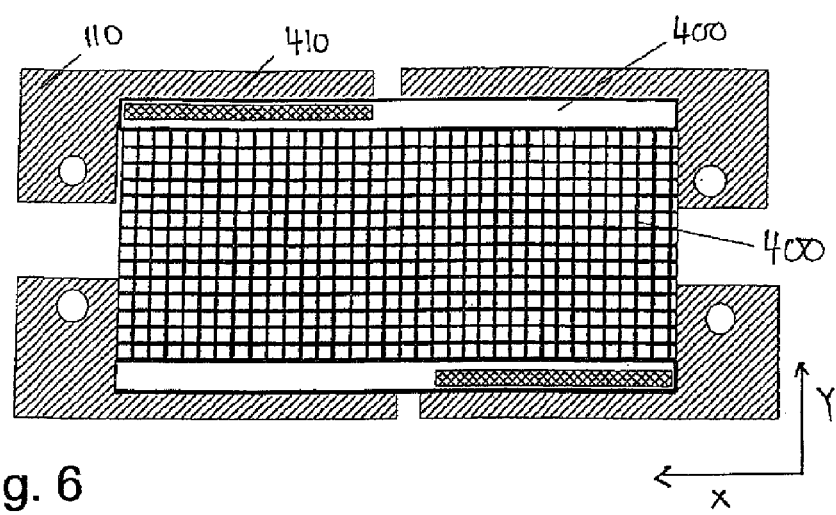
Figure 7A:
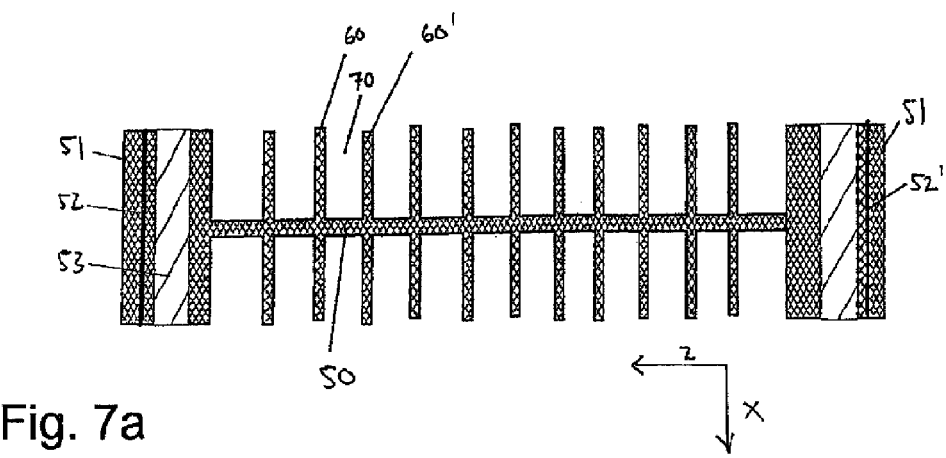
Figure 7B:
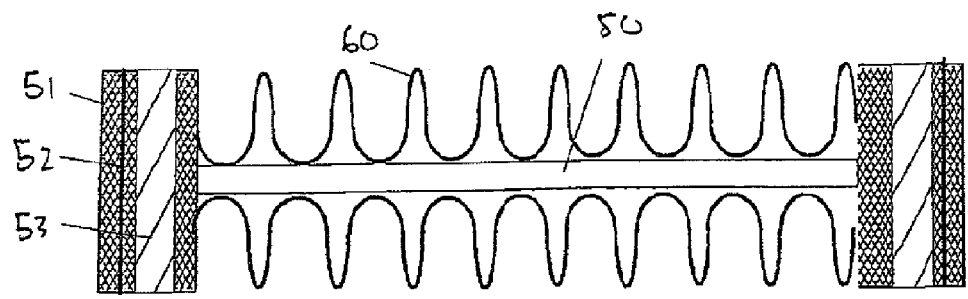
Figure 7C:
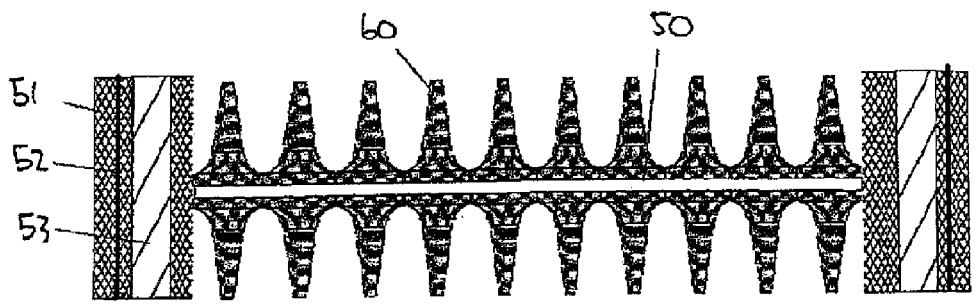
Figure 7D:
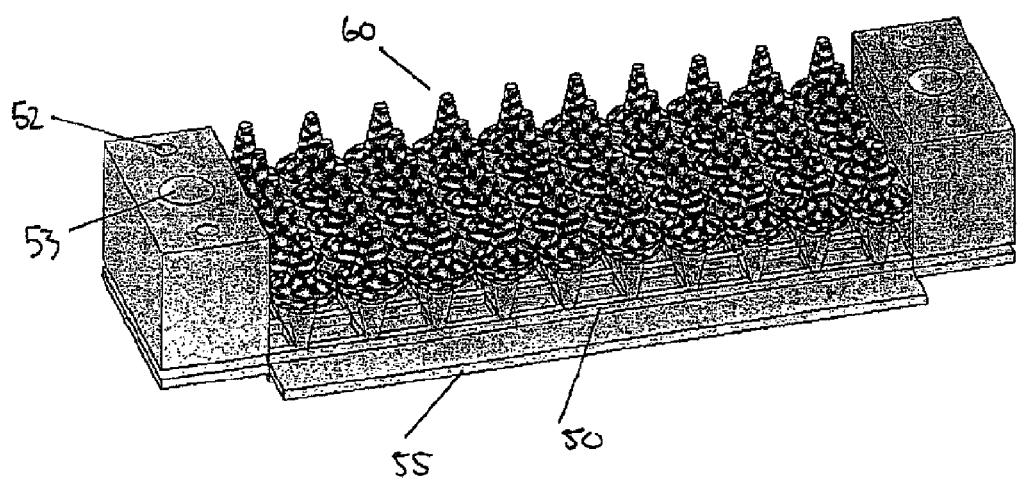
Figure 7E:
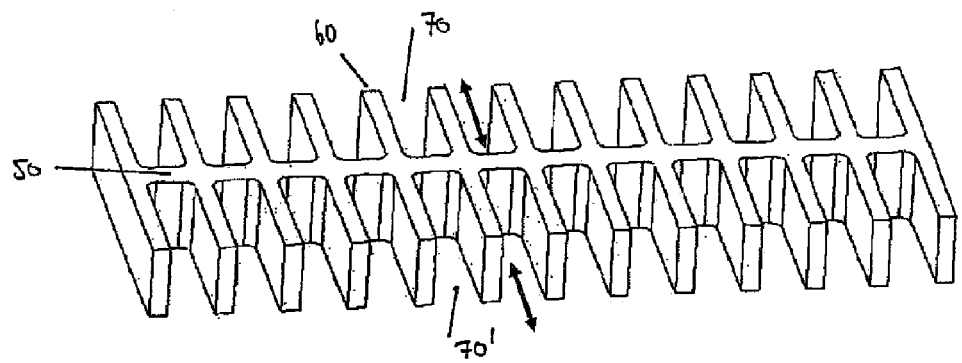
Figure 7F:
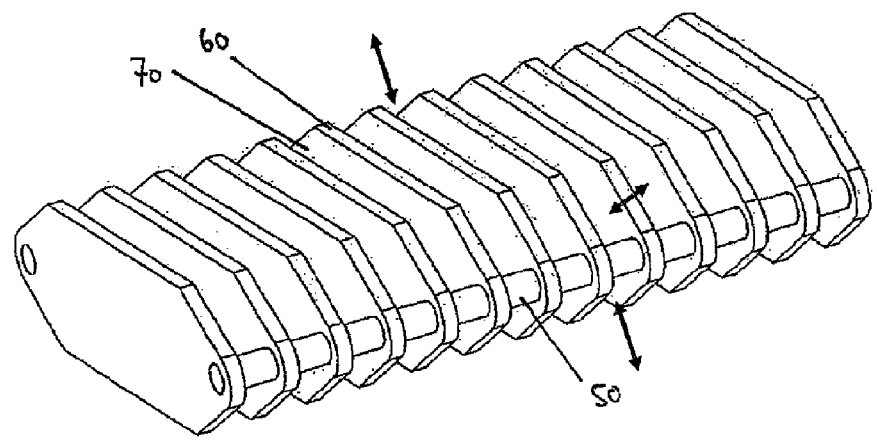
Figure 7G:
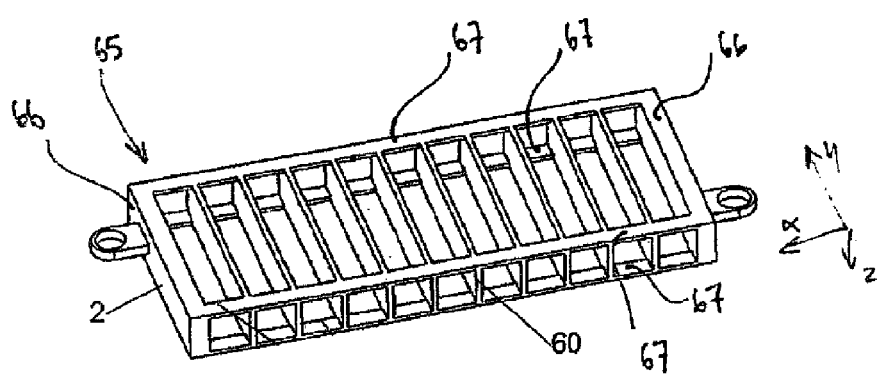
Figure 8A:
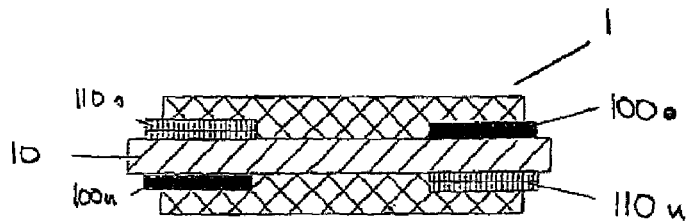
Figure 8B:
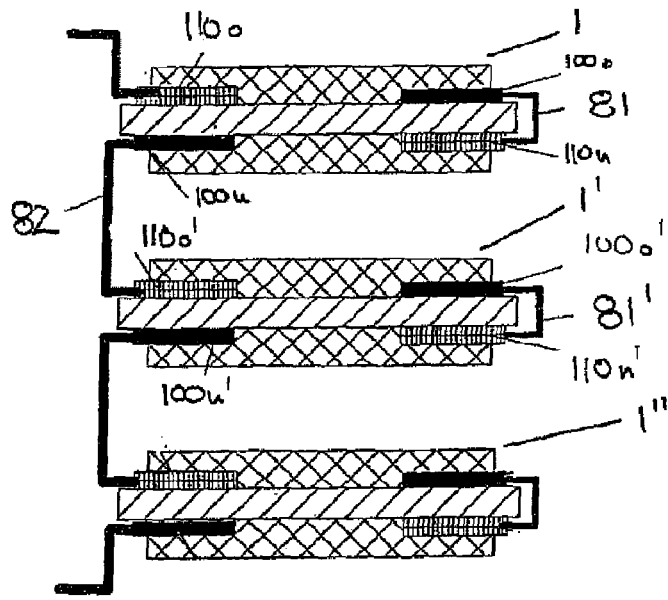
Figure 8C:
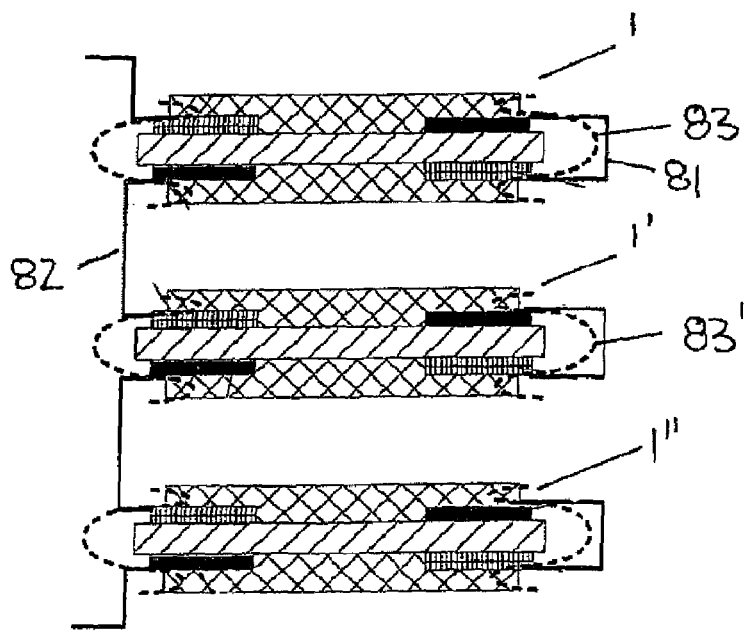
Figure 8D:
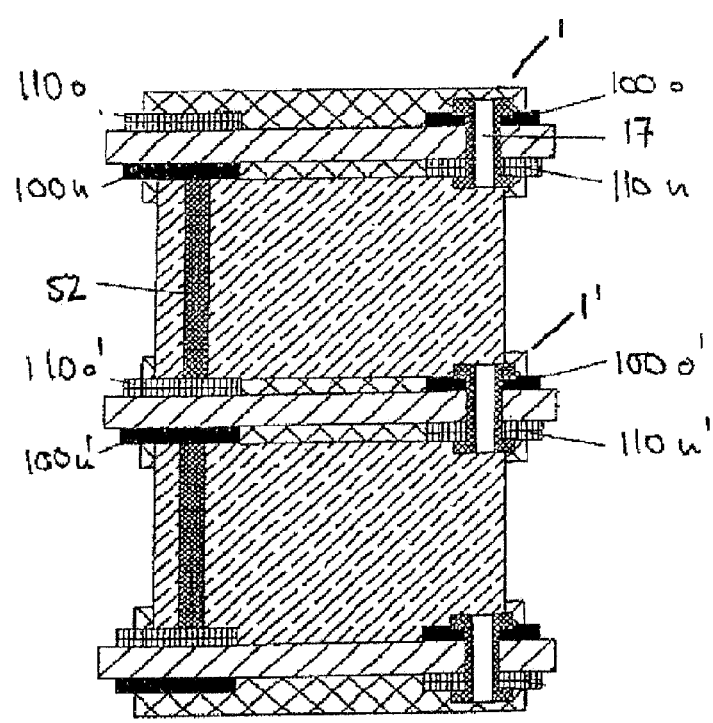
Figure 9A:
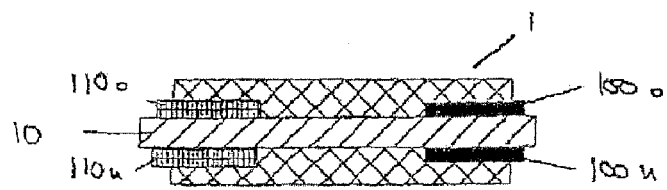
Figure 9B:
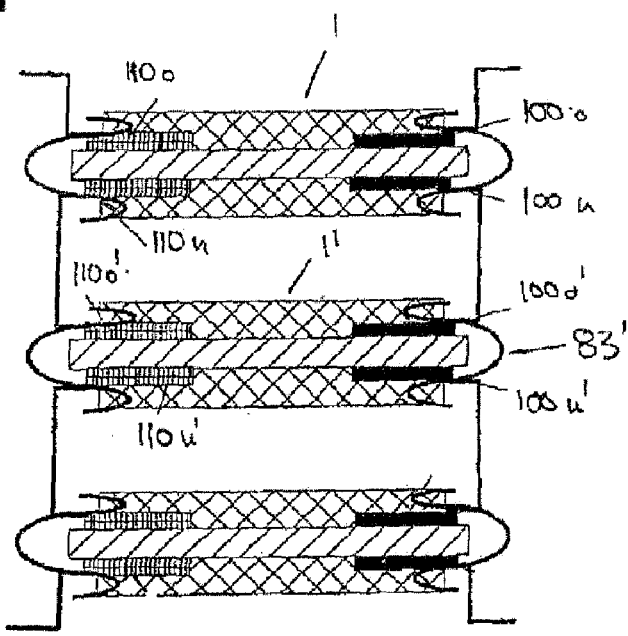
Figure 9C:
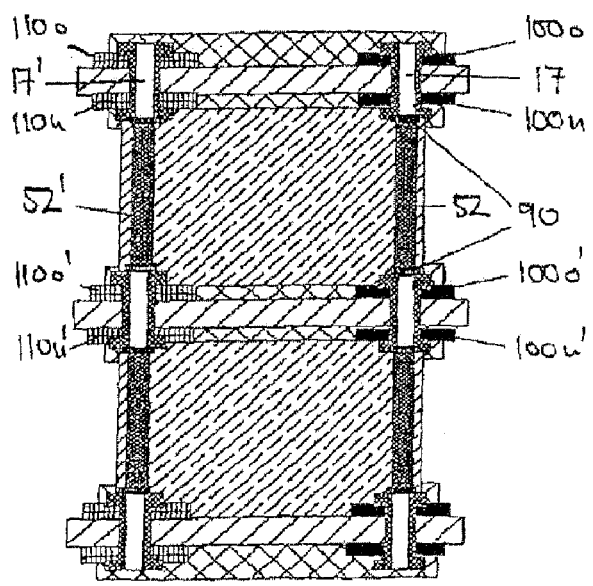

Further features and advantages of the invention become clear in the subsequent description of a fuel cell stack with bi-fuel cells, with reference to the Figures. There are shown:

FIGS. 1a, 1b, 1c construction of fuel cell stacks comprising bi-fuel cells and separator structures with edge elements, FIGS. 2a and 2b construction of a bi-fuel cell, FIGS. 3a and 3b construction of the fuel distributor layer of the bi-fuel cell, FIGS. 4a and 4b construction of the microflow fields in the bi-fuel cell, FIGS. 5a and 5b metallisations of the end regions of the bi-fuel cell, FIG. 6 construction of a cathode current conductor, FIGS. 7a to 7g construction and embodiments of the separator structure, FIGS. 8a to 8d connection of the bi-fuel cells in series, FIGS. 9a to 9c connection of the bi-fuel cells in parallel.

In FIG. 1a, the basic mode of construction of a fuel cell stack with bi-fuel cells and a separator structure according to the invention is explained. The bi-fuel cells 1, 1'—each taken per se—have two electrical cells. Between the two bi-fuel cells 1, 1' is situated a separator structure 2' which separates the right fuel cell of the bi-fuel cell 1 from the non-visible left fuel cell of the bi-fuel cell 1'. In the stack construction, the bi-fuel cells 1, 1' are disposed between separators 2, 2', 2" and completed by further bi-fuel cells and separator structures on the left and right of the elements 2 and 2".

In FIG. 1b, a similar stack is represented in the X-Z plane. In the stack there are situated four bi-fuel cells 1, 1', 1", 1''' which respectively are embedded on the right and left by separator structures. The separator structures configured on the left edge and on the right edge are hereby configured as edge elements 3, 3' via which the contact pressure for the bi-fuel cells 1, 1', 1" 1''' is produced. The contact pressure is thereby conveyed further via the separator structures 2, 2', 2" to the respectively nearest bi-fuel cell. The advantage of the stack construction resides in the fact that the contact pressure for a large number of fuel cells can be applied at the same time. At the same time, a further saving in weight is achieved in that the bi-fuel cells 1, 1', 1" 1''' are used, which further reduce the material consumption. In the intermediate spaces of the separator structures 2, 2', 2" or of the edge elements 3, 3', no fuel is situated, but rather they serve inter alia to ensure a passive air supply to the fuel cells. This becomes obvious also from FIG. 1a in which it is shown that the separator structures 2, 2', 2" are open on both sides in the X-direction, which enables a passive exchange of air with the environment. Further features illustrated here of the separator structure and the bi-fuel cells are dealt with in the further Figures.

In FIG. 1c, a similar embodiment is represented, no end plates being present for the sake of clarity. In a real embodiment, the end plates are present. The fuel cell stack has a large number of bi-fuel cells 1, 1', 1" 1"', the bi-fuel cells being at a spacing from each other by respectively one separator structure 200', 200", 200"'. The illustrated spacing between the bi-fuel cells and the separator structures is present merely for more clarity: in the operating state, the separator structures are situated on the bi-fuel cells in such a manner that the circumferential frame of the separator structure is situated in the outer, non-active region of the fuel cell in which also the seal of the respective MEA of the bi-fuel cell is situated. In this way, a uniform contact pressure can be exerted on the seals. The separator structures 200, 200"" have a smaller cross-section in the z-direction since only one fuel cell need be supplied, whilst the separator structures 200', 200", 200"' respectively must supply a fuel cell in the z-direction at the top and bottom. The separator structure 200' or 200 is dealt with more precisely in FIG. 7g.

In FIG. 2a, the construction of a bi-fuel cell used here is represented. The bi-fuel cell hereby comprises a central fuel distributor layer 10 on which respectively one microflow field 20, 20' is applied on both sides in the Z-direction. Connected to the microflow field 20 or 20' there is situated the membrane electrode assembly (MEA) 30 or 30', the MEA 30 and the MEA 30' being connected via seals 300 and 300' to the microflow fields 20 and 20' such that a closed inner space is produced between the two MEAs 30, 30'. Since one of the layers, 10, 20, 20' is configured as anode current conductor, the anode space has hence a closed configuration. Connected respectively to the MEA 30 or 30' is a cathode current conductor 40, 40'. The MEAs 30, 30' can, on the electrode layers of anode and cathode, have additional gas diffusion layers which are however not illustrated in FIG. 2a. Furthermore, the bi-fuel cell 1 has openings 13, 13' both for the fuel inflow and the fuel outflow and holes 17, 17' which can be configured with an electrical conductor for the electrical contacting of different cells. From the mode of construction of the bi-fuel cell 1 in FIG. 2a, it can be detected clearly that two separate electrical cells are present, the fuel distributor layer 10, both the electrical cell comprising the elements 20, 30, 40 and the electrical cell comprising the elements 20', 30', 40' being supplied with fuel. One feature of the bi-fuel cell is that almost all the layers, i.e. the fuel distributor layer, the microflow fields 20, 20' and the cathode current conductors 40, 40', can be produced from plastic material or metallically coated plastic material or plastic woven fabric. In order to be able to produce the bi-fuel cell in a very thin embodiment, it is sensible to produce the microflow fields 20, 20' and also the cathode current conductors 40, 40' in a foil construction. Irrespective of the structure of the bi-fuel cell 1 shown here, some of the illustrated features in FIG. 2a are not absolutely necessary for the operation of such a bi-fuel cell.

It is possible to dispense with the microflow fields 20, 20'. When these are dispensed with, parts of the fuel distributor layer 10 must be configured as anode current conductor, it depending here upon the subsequent connection whether the fuel distributor layer can be electrically conductive as a whole or whether only the upper layers of the distributor layer 10 or the lower layers of the distributor layer 10 are metallised and whether the actual fuel distributor layer has an insulating configuration. The first case is tantamount to saying that the two electrical cells of the bi-fuel cell share an anode current conductor. The anode current conductor is hereby produced as a single anode current conductor in the fuel distributor layer 10. In the second case, the two electrical cells have two anode current conductors which are insulated from each other, the anode current conductors respectively being placed on the upper side of the fuel distributor layer or on the underside of the fuel distributor layer, the fuel distributor layer per se having an insulating configuration.

In the case where the two electrical cells of the bi-fuel cell 1 have a common anode current conductor, the two different electrical cells of the bi-fuel cell 1 cannot be connected in series.

In FIG. 2b, an alternative construction of a fuel cell 90 is represented. The fuel cell 90 is a simple fuel cell but can also describe the construction of a bi-fuel cell by mirroring the individual layers. The fuel cell 90 has an anode flow field 10' which comprises a metallised plastic material. The metallisation is applied as a metal grating. Alternatively, the anode flow field itself can have an electrically conductive configuration. A gas diffusion layer 201 is disposed between the anode flow field 10' and the MEA 30". A further gas diffusion layer 202 is disposed between the MEA 30" and the current conductor grating 40". The MEA 30" is sealed at the edge with a seal or adhesive so that a gas-tight anode space is produced between the MEA 30" and the anode flow field 10'.

The gas diffusion layers can be used alternatively to form a fine structuring of the anode flow field 10 of FIG. 2a. Likewise, the gas diffusion layers are sensible in the case of a fine (or even missing) structuring if the surface of the fuel cell grows in the xy-plane.

In FIGS. 3a and 3b, the fuel distributor layer 10 illustrated here is explained in more detail. The fuel distributor layer 10 has fuel inflow and outflow holes 13, 13', a channel structure 14 and schematically illustrated channels 16.

In FIG. 3b, the channel structure 14 is characterised in that it is connected to the inflow hole 13 via a main channel 15 with the channel arms 16. An analogous structure 13', 14', 15' and 16' is responsible for the fuel outflow. The holes 17 are configured for guiding through electrical contactings. The portions 18 which protrude respectively beyond the active region of the bi-fuel cell are of particular importance in order to be able to achieve a better lateral current conduction and cooling of the bi-fuel cell there.

In FIG. 4a, the fuel distributor layer 10 is connected respectively in the X-direction on both sides to a microflow field 20. In the microflow fields 20, 20', electrical contactings 17 are also present, which overlap the electrical contactings 17 of the fuel distributor layer. The microflow fields 20, 20' can hereby be separately produced substrates or foils which are applied on the fuel distributor layer 10. Equally however, they can also be produced jointly during the production of the fuel distributor layer 10. In a simple case, the structure shown in FIG. 3 comprises fuel distributor layer 10 and microflow fields 20, 20' merely made up of two substrates which are connected to each other in a gas-tight manner: one which contains the fuel distributor layer internally and the flow fields 20, 20' externally and one with a smooth inside and flow field 20 outside. In the case where the substrates are produced from an insulator, then a metallisation is applied on the flow fields over the entire surface for the current conduction. This can be effected by chemical coating, sputtering or sputtering and electroplating. Corrosion-stable layers are for example Ag, or TiW—Au, NiCr—Au. Furthermore, thin steel or aluminium foils are conceivable as current conductors, which are provided with an electrically conductive organic protective layer.

FIG. 4b is an individual microflow field 20 represented in the X-Y plane. The microflow field is fitted on the fuel distributor layer 10 in such a manner that the holes 21 coincide with the end points of the channels 16 of the fuel distributor structure. This means that the fuel, which enters through the hole 13 into the fuel distributor layer and is transported via the channel system 15 and 16, emerges at the microflow fields through the holes 21. The flow field structure is thereby produced by webs 22 which are disposed at a specific angle relative to the fuel distributor structure 10. However, other structures are also possible for the elements 22, such as e.g. meanders which connect the upper openings 21 to the lower openings 21'. Furthermore, a seal 300 which serves to seal the anode space by the membrane electrode assembly 40 is visible at the edge.

In FIG. 5, the metallisation of an anode current conductor is represented, as it is produced here by the flow field 20. The metal surface 100 covers the entire active region of one of the electrical cells of the bi-fuel cell, the active region 25 of the fuel cell in FIG. 5 being formed by the surface which is covered by the microflow field 20 with the seal 300. Furthermore, the metallisation is extended into the regions 18 and 18' of the fuel distributor structure. The metal surface 100 represents the negative pole. In addition to the metallisation regions 100, two further metallisations 110 which are advantageously connected to the cathode to be applied subsequently are applied. Advantageously, the structuring of the metal surfaces 100, 110 can be effected most simply subtractively by laser ablation.

In FIG. 5b, a further reinforced metallisation 120 is applied but only outwith the active anode region 25. By means of the additional metallisation of the edge region, the ohmic losses by the current conduction to the current collectors on the narrow sides along the Y-direction of the metallisation 120 can be reduced. Furthermore, the heat dissipation of the bi-fuel cell is improved by the additional metallisation 120. As a result, it is possible to operate the bi-fuel cell with a higher power density, which affects the fuels with which the bi-fuel cell can be operated. Since the additional metallisation 120 is applied in the non-active region of the bi-fuel cell and is separated from the anode space by the seal 300, the corrosion problems which occur in the active anode space, can be reduced and ordinary metals, such as copper, aluminium or nickel, can be used for the metallisations. The layers can hereby be applied by chemical or electroplating reinforcement or by applying electrically conductive metal foils connected by electrically conductive adhesives.

In FIG. 6, the cathode current conductor 40 is represented. This comprises a grating-shaped structure. The grating-shaped structure has as large an opening ratio as possible so that oxygen can be transported to the cathode unimpeded. A development of the current conductors 40 or 40' is achieved in that a plurality of grating structures is situated one above the other, which form a mechanically stable and simultaneously finely structured pattern on the cathodes. This development is reinforced in addition in that the grating structure is configured as a porous grating structure. Because of the grating-shaped configuration of the current conductor foil, the contact pressure can be uniformly distributed and the ohmic losses minimised. Advantageously, the metallisation of the cathode comprises the same materials or layers as that of the anode. Corrosion problems are avoided by such a configuration. In principle, it is however also possible to use different materials assuming that the material properties thereof are adequate for the role of cathode.

Analogously to the anode side, an additional metallisation 400 is situated on the current conductor 40 of the cathode which is disposed outwith the active region of the bi-fuel cell. The active region of the bi-fuel cell should thereby be seen as the equivalent of the sealed region of the anode side.

The reinforced metallisation 400, just like the additional metallisation 120 on the anode side, has the role of minimising the ohmic loses and consequently of achieving a better energy yield. This is necessary in that, from each individual cell, the current is conducted firstly laterally to the exterior and only there is the connection to the other cells of the fuel cell stack effected. Normally the current flows vertically through the fuel cell stack and, for this purpose, has available the entire cross-section of the fuel cell stack or of the membrane.

Furthermore, contacting to the substrate terminals 110 can be produced via the reinforced region 400 by an additional contact surface 410. In order to produce the additional metallisation, chemical or electroplating reinforcements or also electrically conductive metal foils can be used.

The bi-fuel cell represented in FIGS. 2, 3, 4, 5 and 6 has a closed anode space and an additional metallisation outwith the active region both on the anode- and on the cathode side of the individual electrical cell of the bi-fuel cell which has a very low weight in total because of the materials since most substrates can be configured as foils or lightweight plastic material parts. Furthermore, because of the low thickness of the individual bi-fuel cells, the fuel can be discharged into the anode space finely metered. This can also take place without microflow fields 20, 20'.

An essential component of the arrangements in FIGS. 1a and 1b are the separator structures in 2, 2', 2" which are open respectively on both sides in the Y-direction. These separator structures are explained in more detail in FIGS. 7a to f.

In FIG. 7a, a separator structure 2 is shown in the X-Z plane. This separator structure 2 comprises a carrier structure 50 which extends in the X-direction, by which additional elements 60, 60' are attached in the z- or transverse direction, a channel 70 being configured between the additional elements 60, 60'. By means of the large opening ratio of the channels 70, an air supply with natural convection can be effected. The edge region 51 of the separator structure 2 has both an electrical contacting or line 52 and a channel system 53 which is configured for the fuel supply to the bi-fuel cells. With the help of the electrical contactings 52, different bi-fuel cells can be connected to each other electrically.

The carrier structure 50 can be configured both by a continuous plate and, at least partially or totally, as a grating. In the illustration shown in FIG. 1a, the carrier structure 50 is configured as a grating. Likewise, a carrier structure 50 is possible in which a central strut connects the edge regions 51 and 51' together and transverse struts emanate from this edge strut in the Y-direction, on which transverse struts the additional elements 60 or 60' are fitted in turn in the Z-direction. As a result, it is possible that an individual separator structure subjects the oppositely situated cathodes of two different bi-fuel cells 1 and 1' to a flow of air by natural convection. It is also possible that a fan with only a low pressure drop blows air into the channels with a large opening.

In FIG. 1a, the size ratios of the bi-fuel cells 1, 1' and of the separator structures 2, 2', 2" can be detected. Since the separator structure serves for natural ventilation and transporting away of the recombined protons, the separator structure 2 is configured to be very much thicker in the z-direction than the bi-fuel cell 1. In order to achieve a saving in weight, plastic material or plastic composite materials can be used as materials for the separator structure 2. A configuration as a plastic woven fabric which is covered by a layer of resin can likewise increase the pressure stability which is required to produce the contact pressure of the bi-fuel cell 1 by the separators 2 and 2'. The separator structure 2 can thereby be produced in an injection moulding process. A further saving in weight is produced by configuring the carrier structure 50 as a grating.

In FIG. 7b, a further embodiment of the separator structure 2 is provided. The additional elements 60 are hereby formed by an undulating metal sheet. The undulations are formed thereby such that a large cross-section towards the cathode is produced and only a narrow unused cross-section is present on the carrier structure side. The undulating metal sheets can hereby be glued, welded or soldered to the carrier structure 50.

A particularly lightweight embodiment of the separator structure 2 is provided in FIG. 7c. Here, the additional elements 60 are formed as knobs made of woven fabric or knitted fabric and are subsequently saturated with a synthetic resin. As a result, there is produced a very open-pore structure which is very light but, because of the existing widening of the knobs 60 towards the base of the knobs 60, has very high mechanical rigidity and hence can transmit very high contact pressures. The knobs which can be configured also as webs, are hereby applied on the carrier structure 50, the carrier structure 50, as shown in FIG. 7d, being configured as a grating. The carrier structure 50 together with the additional elements 60 can thereby be manufactured in one piece. The additional elements 60 can however also be connected subsequently to the carrier structure 50, for example with a synthetic resin.

In FIG. 7d, a plate 55 which seals the grating-shaped structure 50 on one side is visible in addition. Hence, the separator structure 2 illustrated here can be used as edge element 3. For this purpose, the additional elements 60 are fitted only on one side of the plate 55.

Further spatial representations of a separator structure according to the invention are represented in FIGS. 7e and 7f. In FIG. 7e, the additional elements 60 are configured as lamellae and, between two oppositely situated channels 70 and 70', there is no direct connection. The exchange of gas is effected here passively, i.e. by natural convection and diffusion along the direction of the illustrated arrows. A single fan cannot undertake the ventilation of all the channels 70 and 70' if the carrier structure 50 extends in the X-Y plane, as represented in FIG. 1.

In FIG. 7f, a particularly simple separator structure is illustrated. The carrier structure 50 is hereby formed by two pins, which connect numerous additional elements 60 to each other. There are consequently produced large continuous channels 70 which enable both a passive exchange of gas and ventilation by a fan since the air need be conducted only around the carrier structure.

According to the descriptions of various embodiments of the separator structure 2 in FIG. 7, finally the construction of the fuel cell stack in FIG. 1b is explained once again. The pressing together of the fuel cell stack, which comprises the bi-fuel cells 1, 1', 1'', 1''', the bi-fuel cells being separated from each other by the separators 2, 2' and 2'', is effected via the edge elements 3 and 3'. Since the electrical connection is effected via the electrical contactings of the bi-fuel cells 17 or the electrical contactings of the separator structures 52, the contactings 52 of the separator structure 2 respectively being in connection with the contactings 17 of the bi-fuel cells 1 and 1' and analogously thereto the fuel supply via the openings 13, 13' of the bi-fuel cells and the openings 53, 53' being effected laterally on the separator structures 2, 2', 2'' and on the separators configured as edge elements 3 and 3', the edge elements 3, 3', apart from producing and transmitting the contact pressure to the bi-fuel cells 1, 1', 1'', 1''' and the separator structures 2, 2', 2'', need have no further functionality. Similarly to the separator structures 2, 2' and 2'', they can therefore be produced from lightweight constructional materials.

The separator structure 200' is represented in FIG. 7g. The separator structure 200 differs merely as a result of the smaller cross-section as shown in FIG. 1c. The separator structure 200' has a circumferential frame 65 which connects together the additional elements 60 configured as lamellae. The lamellae thereby extend in the yz-plane. The circumferential frame 65 is, at the edges 66 thereof situated in the x-direction, for sealing purposes continuous and closed. Between the individual elements 60, webs 67 extend.

The frame 65 is configured in such a manner than the latter comes to be situated in the outer, non-active region of the fuel cell. As a result, for example the seals 300 of the bi-fuel cell which are visible in FIG. 2a are covered so that a uniform contact pressure is exerted on the seals 300 or 300'. The separator structure 200' or 200 is produced analogously to the separator structure 2 from lightweight constructional materials.

There can be used as materials of a low weight and high rigidity, foamed metals, composite materials, phenol resin-saturated woven fabric structures or plates with an octagonal column structure comprising saturated woven fabrics. Additional metal plates which receive thin tensioning screws or tensioning means, such as wires or cables, can be applied on these. The tensioning elements should hereby extend as closely as possible alongside the active region of the bi-fuel cells. Therefore it is favourable to provide surfaces 18 or 18', which extend for cooling and current conduction beyond the active region of the bi-fuel cells, with holes through which the tensioning elements extend.

The edge elements 3, 3' press the fuel cells stack together. The edge elements can be produced from sandwich-like plates which are filled with metal foam or a honeycomb structure and which are delimited respectively on one side by thin glass- or graphite fibre composite plates.

In a further embodiment of the fuel cell stack, it is possible that the fuel supplies 53 of the separators 2 are not used. In this case, the bi-fuel cells must be connected to extra hoses or tubes which are flexible in sections so that no fuel can emerge from the anode region.

It may be mentioned yet again at this point that the exchange of gas which is made possible by the separator structure and the transmitted or produced contact pressure is useful also when using normal fuel cells. Although a part of the saving in weight relative to bi-fuel cells is forfeited when using normal fuel cells, the saving in weight gained because of the separator structure is furthermore an advantage relative to the state of the art.

In order to explain the electrical connection of the bi-fuel cells of a fuel cell stack according to the invention to each other and of the individual cells of an individual bi-fuel cell to each other, the electrical connections of the bi-fuel cells in FIGS. 8 and 9 are represented in series connection and in parallel connection.

In FIG. 8a, the metallisations 100o and 110o of the upper electrical cell and the metallisations 100u and 110u of the lower electrical cell of one bi-fuel cell are shown, the metallisations 100 being connected to an anode and the metallisations 110 to a cathode.

In order to connect the upper and the lower electrical cell in series, the anode of the upper electrical cell is connected to the cathode of the lower electrical cell via an electrical contacting 81, as shown in FIG. 8b.

In FIG. 8b, the bi-fuel cells 1, 1', 1'' are connected to each other in series. In addition to the contactings 81, the anode of the lower electrical cell 100u of the bi-fuel cell 1 and the cathode of the upper electrical cell 110o' of the bi-fuel cell 1' are connected via an electrical contacting 82. In FIG. 8b, the three bi-fuel cells 1, 1', 1'', in total therefore 6 electrical individual cells, are connected together.

In FIG. 8c, it is shown how the connections 81, 82 are effected with the help of mechanical and flexible clamp elements 83. The clamp elements 83, on their inside, have electrical contactings in order to produce the corresponding connection between two oppositely situated anodes and cathodes of different electrical cells of one bi-fuel cell. In order to produce the connection between two anodes and cathodes of different electrical cells of different bi-fuel cells, the two clampings must comprise insulating material and be in connection conductively only via an additional electrically conductive connection 82. The clampings can be configured in the form of a small flexible cable. It is achieved by this form of connection that the clamps transmit no forces between the bi-fuel cells. The contact pressure of the fuel cells is produced merely by the tensioning of the tensioning elements and transmitted between the individual bi-fuel cells via the separators.

In FIG. 8d, the electrical connection between the anodes and cathodes is produced not via clamps but via the electrical contactings 17 of the bi-fuel cell and the electrical contactings 52 in the edge region 53 of the separator structure 2. These contactings can, as is normal in circuit board technology, be produced by internally metallised borings. The connection of the anode 100u to the electrical contacting 52 and the cathode 110o' is thereby effected after assembly of the fuel cell stack by soldering or conductive adhesion.

A parallel connection of the bi-fuel cells to each other or of the electrical cells of an individual bi-fuel cell can be produced in a similar manner. This parallel connection can be advantageous in the small power field since the main consumers operate only at small voltages between 1 and 2 volts. Possibly, it is also convenient to connect a plurality of parallel-connected fuel cell stacks in series. As a result of the parallel connection of the bi-fuel cells in the stack, the total function of the fuel cell stack becomes more robust since an individual defective bi-fuel cell in fact reduces the power but the stack voltage does not collapse so quickly and pole reversal of the individual electrical cells does not take place.

In order to connect the individual electrical cells of an individual bi-fuel cell together in parallel, there are connected together the negative pole 100o to the negative pole 100u or the positive pole 110o to the positive pole 110u. In FIG. 9b, the connection of different bi-fuel cells 1, 1' and 1" is achieved via clamping elements 83. The connection via the clamping elements 83 can thereby have a detachable configuration or be non-detachable in that the clamps are fixed by gluing or soldering.

In FIG. 9c, the parallel connection of the individual cells is achieved via the electrical contactings 17 or 17'. The contacting 17 hereby connects the negative poles of the upper and of the lower electrical cell of the bi-fuel cell 1 and the contacting 17' connects the positive pole of the upper and the positive pole of the lower cell of the bi-fuel cell 1. Via the contactings 52 and 52' in the end region of the separators 2, the negative pole 100u of the bi-fuel cell 1 is connected together to the negative pole 100o' of the bi-fuel cell 1' via the connections 90 and, analogously thereto, the positive pole via the contacting 52'.

What is claimed is:

1. Fuel cell stack, comprising:
   at least one fuel cell; and
   at least two separator structures, respectively one separator structure being disposed respectively on one of the two oppositely situated sides of the fuel cell, wherein each separator structure is open on at least one side in order to allow the exchange of gas at a cathode and, in the edge region of the separator structure, a closed channel system for fuel is provided, wherein the fuel cell further has a non-active region including an additional or reinforced metallic layer in comparison with the active region, the additional or reinforced metallic layer in a part protruding in a direction substantially parallel to a plane of the metallic layer beyond the separator structure for cooling the fuel cell.

2. Fuel cell stack according to claim 1, wherein the fuel cell is configured as a bi-fuel cell and has respectively two electrical insulated cells with externally situated cathode.

3. Fuel cell stack according to claim 1, wherein the fuel cell has a closed anode region which is sealed relative to the environment with seals.

4. Fuel cell stack according to claim 1, wherein the metallic layer is a metallization.

5. Fuel cell stack according to claim 1, wherein the fuel cell has a solid, at least one-layer, fuel distributor structure, at least one layer being configured as channel structure and current conductor of the anode.

6. Fuel cell stack according to claim 5, wherein the fuel distributor structure, in the transverse direction, has respectively a microflow field with depressions or raised portions on at least one side.

7. Fuel cell stack according to claim 1, wherein the separator structure has a mechanical minimum rigidity in order to transmit a contact pressure to a fuel cell.

8. Fuel cell stack according to claim 1, wherein the separator structure has a carrier structure and, in the transverse direction relative thereto, further additional elements are fitted on at least one side, the space between the additional elements forming parts of the channels of the separator structure.

9. Fuel cell stack according to claim 8, wherein the carrier structure is configured at least partially as a grating or as struts with protruding struts or as pins.

10. Fuel cell stack according to claim 8, wherein the additional elements are configured as one of plates, columns, and pins.

11. Fuel cell stack according to claim 8, wherein the spacings of the additional elements relative to each other are essentially equal to the spacings of the openings of the cathode current conductors relative to each other.

12. Fuel cell stack according to claim 1, wherein the separator structure comprises a plastic material.

13. Fuel cell stack according to claim 1, wherein the separator structure allows a passive exchange of gas with the environment.

14. Fuel cell stack according to claim 1, further comprising a fan configured to increase the exchange of gas at the separator structure.

15. Fuel cell stack according to claim 1, wherein the separator structure comprises resin-saturated plastic woven fabric.

16. Fuel cell stack according to claim 1, wherein the separator structure comprises an undulating metal sheet.

17. Fuel cell stack according to claim 1, wherein the separator structure has additional electrical contactings in the edge region.

18. Fuel cell stack according to claim 1, wherein the separator structure is manufactured as edge element and/or end plate of the fuel cell stack and has a closed configuration on one side.

19. Fuel cell stack according to claim 1, wherein the fuel cell is a hydrogen fuel cell.

20. Fuel cell stack according to claim 1, wherein the fuel cell is a methanol fuel cell.

21. Fuel cell stack according to claim 1, wherein the fuel cell is an ethanol fuel cell.

22. Fuel cell stack according to claim 1, wherein a volume of the fuel cell stack is between 1 cm$^3$ and 500 cm$^3$.

23. Fuel cell stack according to claim 1, wherein the fuel cell includes at least one bi-fuel cell and wherein the two individual cells of the bi-fuel cell are connected in series or in parallel.

24. Fuel cell stack according to claim 1, wherein the fuel cell includes at least two fuel cells, and the connection between two fuel cells has a mechanically flexible and electrically conductive configuration.

25. Fuel cell stack arrangement, comprising:
at least two fuel cell stacks according to claim 1, the fuel cell stacks being connected in series or in parallel.

26. Fuel cell stack arrangement according to claim 25, wherein the fuel cell stack arrangement has a portable configuration.

27. Flying device, further comprising:
a fuel cell stack according to claim 1.

* * * * *